(12) United States Patent
King et al.

(10) Patent No.: US 7,433,975 B2
(45) Date of Patent: Oct. 7, 2008

(54) INTEGRATED CIRCUIT CAPABLE OF MARKER STRIPPING

(75) Inventors: Steven R King, Portland, OR (US); Ronald Dammann, Palo Alto, CA (US); Sujoy Sen, Portland, OR (US)

(73) Assignee: Intel Corporation, Santa Clara, CA (US)

(*) Notice: Subject to any disclaimer, the term of this patent is extended or adjusted under 35 U.S.C. 154(b) by 449 days.

(21) Appl. No.: 11/088,474

(22) Filed: Mar. 24, 2005

(65) Prior Publication Data

US 2006/0218308 A1  Sep. 28, 2006

(51) Int. Cl.
G06F 13/28 (2006.01)
G06F 3/00 (2006.01)
(52) U.S. Cl. .............................. 710/22; 710/30; 710/52
(58) Field of Classification Search ............... 710/8–10, 710/22–35, 52–57, 305–316
See application file for complete search history.

(56) References Cited

U.S. PATENT DOCUMENTS 3,804,993 A * 4/1974 Honnold et al. .......... 369/33.01
5,280,582 A * 1/1994 Yang et al. .................. 709/225
5,727,232 A * 3/1998 Iida et al. ...................... 710/56
6,275,911 B1 * 8/2001 Terada et al. ................ 711/154
2005/0010702 A1 * 1/2005 Saito et al. ..................... 710/52

OTHER PUBLICATIONS

"PCI Express Base Specification Revision 1.0"; PCI Express, Table of Contents; Publication Date Jul. 22, 2002; 15 pages.
"PCI-X Addendum to the PCI Local Bus Specification"; PCI Special Interest Group: Revision 1.0a, Table of Contents; Publication Date Jul. 24, 2000; 9 pages.
Krueger, M. et al; "Small Computer Systems Interface Protocol Over the Internet (iSCSI)"; Network Working Group; Published Jul. 2002; 2 pages.
"IWARP-RDMA over TCP/IP"; Test Specification Release 0.55; Published Jul. 11, 2005; 423 pages.

* cited by examiner

*Primary Examiner*—Christopher B Shin
(74) *Attorney, Agent, or Firm*—Grossman, Tucker, Perreault & Pfleger, PLLC

(57) ABSTRACT

A method, system, computer program product, and expansion card capable of: defining an initial source address within a source memory device. An initial data read operation is performed to retrieve a first X-byte data portion from the source memory device. The initial data read operation begins at the initial source address. The initial source address is incremented by Y bytes to define a secondary source address within the source memory device, such that Y is greater than X.

24 Claims, 5 Drawing Sheets

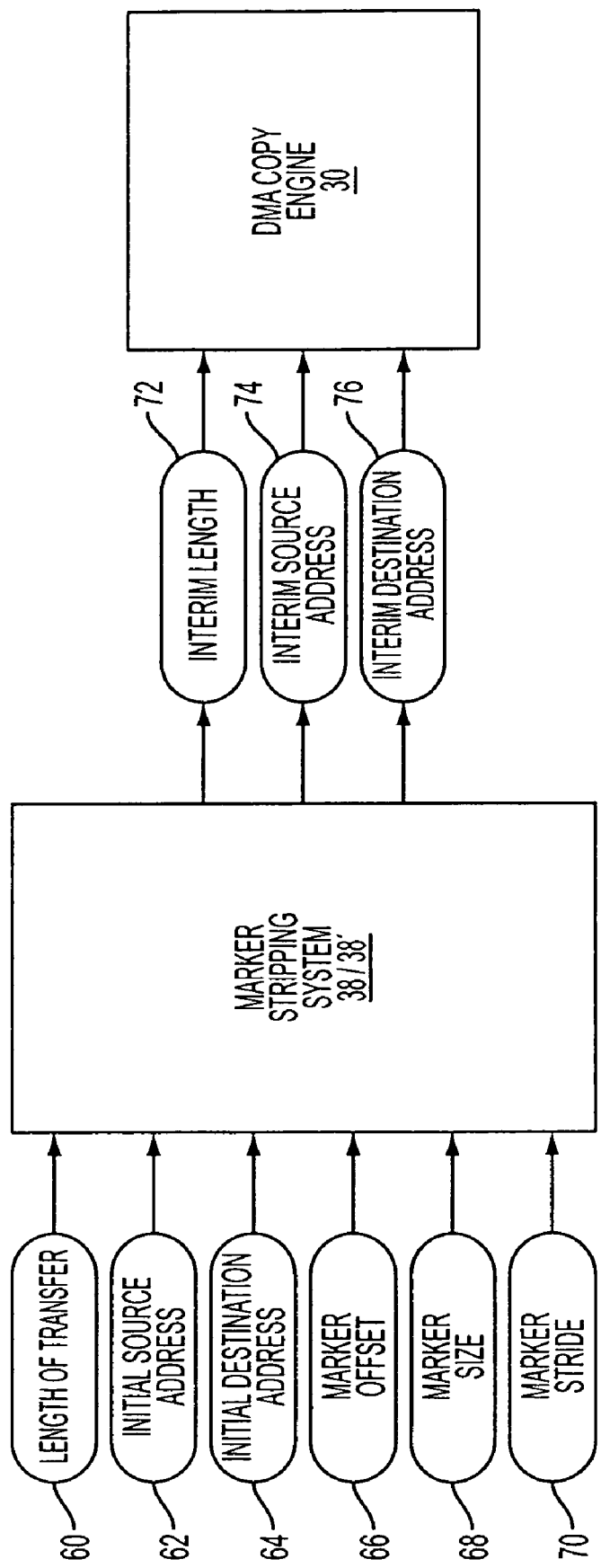

INTEGRATED CIRCUIT CAPABLE OF MARKER STRIPPING

FIELD OF THE DISCLOSURE

This disclosure relates to an integrated circuit capable of marker stripping.

BACKGROUND

When transferring data between devices, the data is often transferred in segments (e.g., data packets and data frames, for example). Depending on the transfer protocol, additional marker data may be embedded within these data segments at predefined intervals. For example, when handling inbound TCP/IP data segments, encoded using the iWARP protocol (i.e., RDMA over TCP; see www.ietf.org/html.charters/rddp-charter.html; see www.rdmaconsortium.org/home), a 4-byte marker is inserted into the data segments at 508-byte intervals. Accordingly, for each 512-bytes transmitted or received, 508-bytes are data bytes and 4-bytes are marker bytes. When processing these data segments, the embedded data markers must be extracted.

BRIEF DESCRIPTION OF THE DRAWINGS

FIG. 2 is a more detailed view of the marker stripping systems of FIG. 1a and FIG. 1b;

DETAILED DESCRIPTION

Figure 1A:
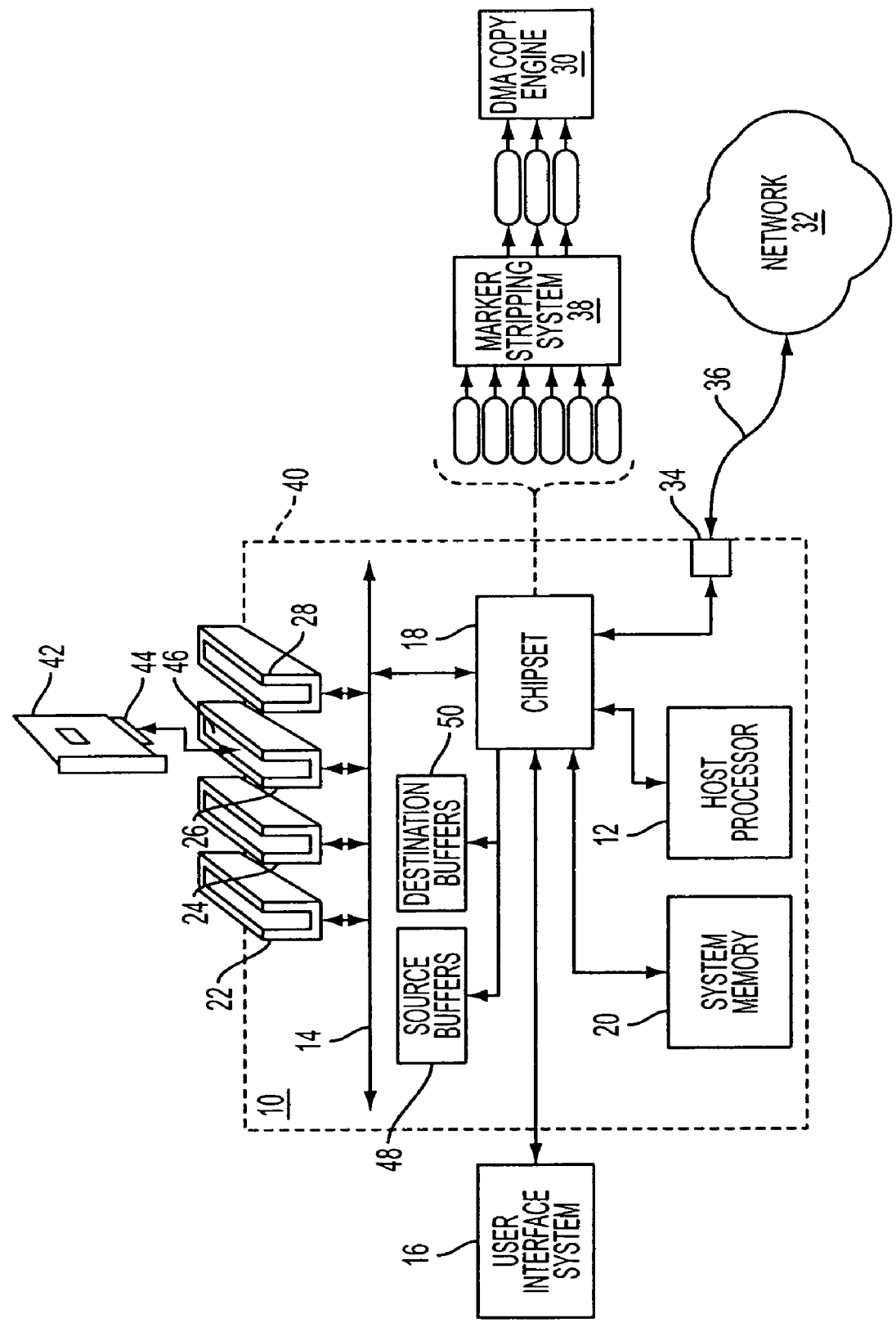
FIG. 1a is a diagrammatic view of a first embodiment of a marker stripping system coupled to a distributed computing network.

Referring to FIG. 1a, there is shown a computer system 10 that includes a host processor 12, a bus 14, a user interface system 16, a chipset 18, system memory 20, and a plurality of expansion slots 22, 24, 26, 28. Host processor 12 may include any variety of processors known in the art such as an Intel® Pentium® IV processor commercially available from the Assignee of the subject application. Bus 14 may include various bus types to transfer data and commands. For example, bus 14 may comply with the Peripheral Component Interconnect (PCI) Express™ Base Specification Revision 1.0, published 22 Jul. 2002, available from the PCI Special Interest Group, Portland, Oreg., U.S.A. (hereinafter referred to as a "PCI Express™ bus"). Bus 14 may also comply with the PCI-X Specification Rev. 1.0a, 24 Jul. 2000, which is also available from the PCI Special Interest Group, Portland, Oreg., U.S.A.

The user interface system 16 may include a variety of devices for human users to input commands and/or data and to monitor the system such as a keyboard, pointing device, and video display. The chipset 18 may include host bridge/hub system (not shown) that couples processor 12, system memory 20, and user interface system 16 to each other and to bus 14. Chipset 18 may include integrated circuit chips, such as those selected from integrated circuit chipsets commercially available from the assignee of the subject application (e.g., graphics memory (not shown), I/O controller hub chipset (not shown) and direct memory access (i.e., DMA) copy engine 30, for example), although additional/other integrated circuit chips may be used.

Chipset 18 may include an integrated circuit chip (not shown) for receiving data from an external network 32 (e.g., the Internet, a local area network, or a wide area network, for example) using one of many protocols (e.g., Ethernet or token ring, for example). Chipset 18 is typically connected to network 32 via a network port 34 and an external cable 36 that is connected to a network device (e.g., a switch or a router, not shown). Additionally, chipset 18 may further include marker stripping circuitry 38 (to be discussed below in greater detail) which may be capable of removing (stripping) markers from the data retrieved from network 34. As used in any embodiment herein, "circuitry" may comprise, for example, singly or in any combination, hardwired circuitry, programmable circuitry, state machine circuitry, and/or firmware that stores instructions executed by programmable circuitry. Processor 12, bus 14, chipset 18, system memory 20, and expansion slots 22, 24, 26, 28 may be integrated onto one circuit board (e.g. system board 40).

Expansion card 42 (e.g., video cards, hard drive controllers and network interface cards, for example) may be configured to be removably inserted into an expansion slot (e.g., expansion slots 22, 24, 26, 28, for example). When expansion card 42 is properly inserted into an expansion slot, connectors 44 and 46 (incorporated into expansion card 42 and expansion slot 26 respectively) become electrically and mechanically coupled to each other. When connectors 44 and 46 are so coupled to each other, expansion card 42 becomes electrically coupled to bus 14 and may exchange data and/or commands with host processor 12, user interface system 16, and/or system memory 20 (via bus 14 and chipset 18). Alternatively and without departing from this embodiment, the operative circuitry of expansion card 42 may be incorporated into other structures, systems and/or devices (e.g., system board 40).

Figure 1B:
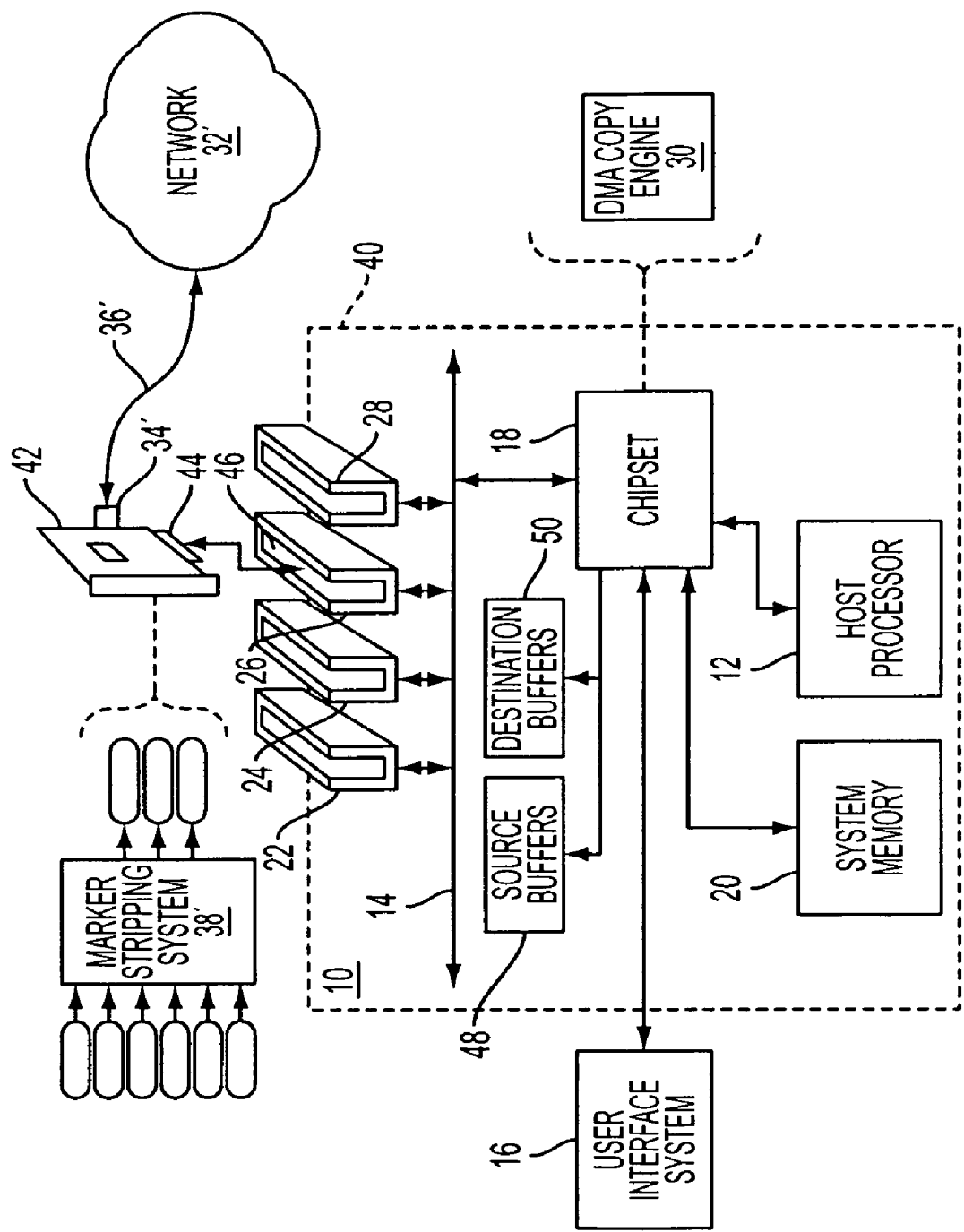
FIG. 1b is a diagrammatic view of a second embodiment of the marker stripping system coupled to the distributed computing network.

Referring also to FIG. 1b, if expansion card 42 is a network interface card, expansion card 42 may include integrated circuit chips (not shown) for receiving data from an external network 32' (which may comprise, for example, the Internet, a local area network, or a wide area network) using one of many protocols (e.g., Ethernet or token ring). Expansion card 42 is typically connected to network 32' via a network port 34' and an external cable 36' that is connected to a network device (e.g., a switch or a router, not shown). Additionally, expansion card 42 may further include marker stripping circuitry 38' (to be discussed below in greater detail) for removing markers from the data retrieved from network 32'.

It should be understood that marker stripping circuitry 38' may operate in a manner similar to marker stripping circuitry 38, and will be described herein as operating in a similar manner (but may be provided in separate and distinct embodiments). Thus, for example, an alternative system embodiment may include the marker stripping circuitry 38' on expansion card 42 (as shown in FIG. 1b), while a separate system embodiment may include the marker stripping circuitry 38 in chipset 18 (as shown in FIG. 1a). Thus, FIG. 1a illustrates a first embodiment of the marker stripping circuitry and FIG. 1b illustrates a second embodiment of the marker stripping circuitry.

Referring also to FIG. 2, there is shown a more detailed view of marker stripping circuitry 38/38'. As will be discussed below in greater detail, marker stripping circuitry 38/38' may receive data from the external network 32/32' that may include six discrete input values (i.e., length of transfer 60, initial source address 62, initial destination address 64, marker offset 66, marker size 68, and marker stride 70) and may process these input values to generate three discrete output values (i.e., interim length 72, interim source address 74, and interim destination address 76) which may be provided to DMA copy engine 30 to allow for the stripping of markers embedded within the data received from network 32.

Figure 3:
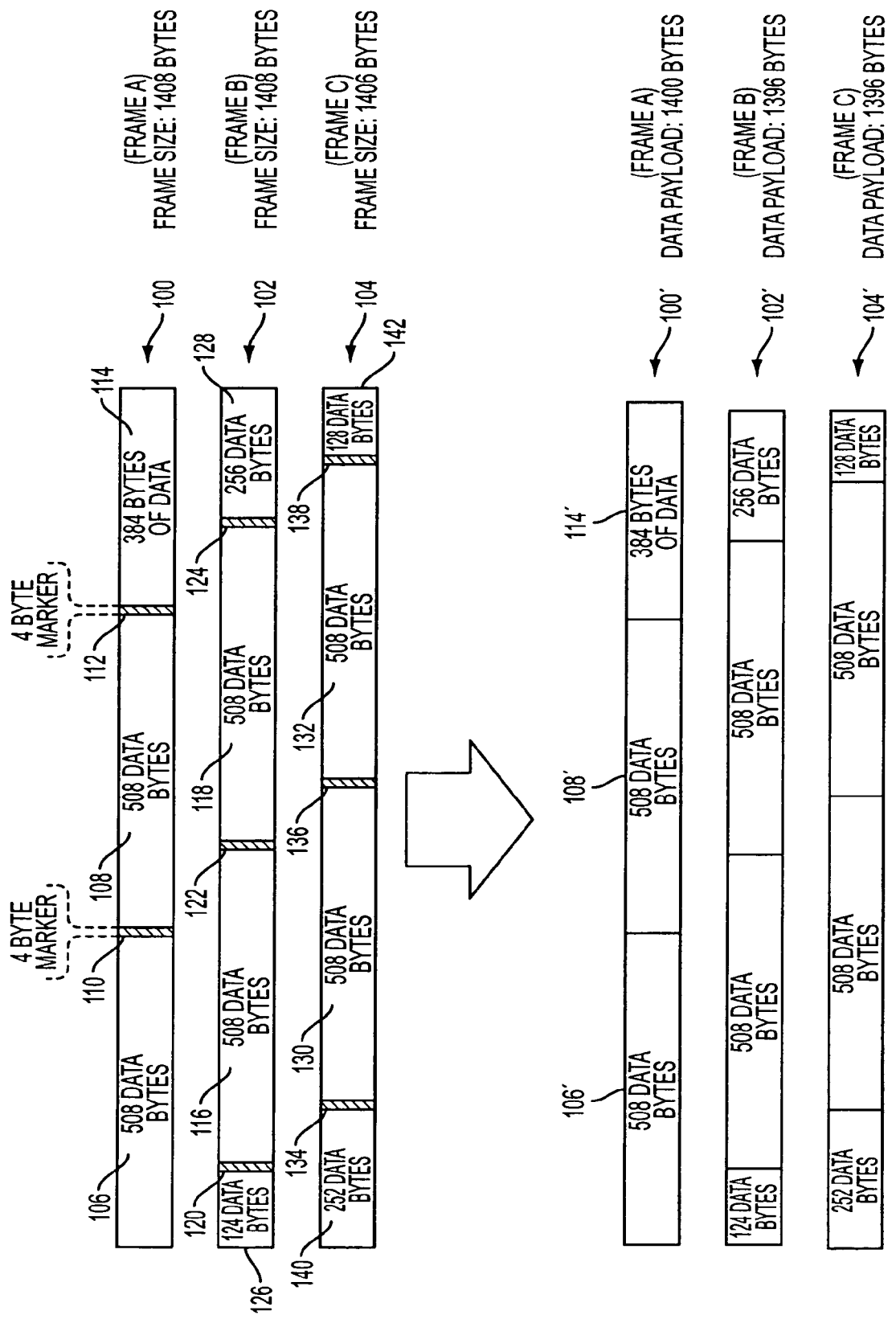
FIG. 3 is a diagrammatic view of data segments received and processed by the marker stripping systems of FIG. 1a and FIG. 1b.

Referring also to FIG. 3, when data is transferred across network 32/32', the data may be transferred in data segments 100, 102, 104 commonly referred to as data frames. A data frame may comprise a data segment that may be transmitted between network points as a unit, and may further include addressing and protocol control information. A data frame may be transmitted serially and may contain a header field and a trailer field that "frame" the data. In at least one communication protocol, a data frame may be 1408-bytes long. Protocol control information may be defined as the set of rules utilized by a communication protocol to transmit data from one point to another.

One exemplary communications protocol include the TCP/IP protocols. TCP (i.e., transmission control protocol) uses a set of rules to exchange messages with other internet points at the information packet level, and IP (i.e., internet protocol) uses a set of rules to send and receive messages at the internet address level. Additional protocol examples include HTTP (i.e., hypertext transfer protocol) and FTP (i.e., file transfer protocol).

Certain protocols may insert markers into the data segments prior to transmission across e.g., network 32/32'. Markers, inserted by the protocol, may be used when "reframing" the data. If the data is transmitted serially in a stream, the stream of data may be reassembled into the data frames in which it was originally transmitted. Accordingly, the markers provide information that may be useful for reframing purposes, such as the number of bytes until the beginning of the next frame.

An example of such a protocol that uses markers is the iWARP protocol, which uses RDMA (i.e., remote direct memory access) over TCP. Specifically, RDMA is a communications technique that allows data to be transmitted from the memory of one computer to the memory of another computer without necessarily passing through either computer's host processor (i.e., central processing unit), without needing extensive buffering, and without calling to a kernel (i.e., the central module of an operating system.). Accordingly, the iWARP protocol offloads processing tasks from the host processor/operating system to specialized hardware, which is typically incorporated into e.g., system board 40 or a network interface card (e.g., expansion card 42). Other protocols that insert markers in data segments include iSCSI (i.e., Internet Small Computer System Interface: an IP-based standard for linking data storage devices over a network and transferring data by carrying SCSI commands over IP networks; as described in "Small Computer Systems Interface protocol over the Internet (iSCSI), Requirements and Design Considerations", published July 2002 by The Internet Society).

Markers that certain protocols (e.g., iWARP) insert into the data segments prior to transmission may be stripped from the data segments upon receipt. For example, when data segments are encoded using the iWARP protocol, a 4-byte (i.e., 32-bit) marker is inserted into each data segment at 512-byte intervals. Accordingly, in the iWARP protocol, for each 512-bytes of data transmitted, 508-bytes are data and 4-bytes are marker.

As discussed above, when data is transferred across network 32/32', the data may be transferred in data segments 100, 102, 104 commonly referred to as data frames (which are typically 1408-bytes long). Data frame 100 may include: two 508-byte data portions 106, 108; two 4-byte data markers 110, 112; and one 384-byte data portion 114, for a total frame length of 1408-bytes. Data frame 102 may include: two 508-byte data portions 116, 118; three 4-byte data markers 120, 122, 124; one 124-byte data portion 126; and one 256-byte data portion 128, for a total frame length of 1408-bytes. Data frame 104 may include: two 508-byte data portions 130, 132; three 4-byte data markers 134, 136, 138; one 252-byte data portion 140; and one 128-byte data portion 142, for a total frame length of 1408-bytes.

When received and processed by marker stripping system 38/38' (in combination with DMA copy engine 30), frame 100 may be stripped of two markers (i.e., markers 110, 112), resulting in stripped frame 100', having a data payload of 1400-bytes. Further, frame 102 may be stripped of three markers (i.e., markers 120, 122, 124), resulting in stripped frame 102' having a data payload of 1396-bytes. Additionally, frame 104 may be stripped of three markers (i.e., markers 134, 136, 138), resulting in stripped frame 104 prime having a data payload of 1396-bytes.

When data frame 100 is received on network port 34/34', data frame 100 may be written to a source memory device 48 (e.g., one of more data buffers; not shown) and the initial source address (i.e., the address of the beginning of the data frame) may be provided to marker stripping system 38. Assuming an initial source address of 0000h, 1408-byte data frame 100 may begin at $0000_h$ and may end at $0057F_h$ (i.e., the hexadecimal equivalent of 1407). Further, 1408-byte data frame 102 may be written to the source memory device beginning at $0580_h$ and may end at $0AFF_h$, and 1408-byte data frame 104 may be written to the source memory device begin at $0B00_h$ and ending at $107F_h$.

Continuing with the above stated example, assume that 1408-byte data frame 100 may be received on network port 34/34' and stored in the source memory device 48 at initial source addresses $0000_h$. Further, assume that data frame 100 may be iWARP encoded and, therefore, may have a 4-byte marker inserted into the data frame at 512-byte intervals, resulting in a maximum of 508-bytes of data positioned between each 4-byte marker. For this example, a total of three data frames (i.e., data frames 100, 102, 104) may be transferred.

At the time the transfer of a data frame is initiated, the protocol layer may provide marker stripping system 38/38' with six discrete input values, namely: length of transfer 60; initial source address 62; initial destination address 64; marker offset 66; marker size 68; and marker stride 70. As discussed above, these six input values may be processed to generate three discrete output values, namely: interim length 72; interim source address 74; and interim destination address 76, which may be provided to DMA copy engine 30 to allow for the stripping of markers (e.g., markers 110, 112) embedded within the received data frame (e.g., data frame 100).

Concerning the six input values, length of transfer 60 may be the total length of the data payload within a data frame. For example, the length of transfer 60 for data frame 100 is 1400-bytes (i.e., the sum of two 508-byte data portions 106, 108 and one 384-byte data portion 114). The length of transfer 60 for data frame 102 is 1396-bytes (i.e., the sum of two 508-byte data portions 116, 118, one 124-byte data portion 126, and one 256-byte data portion 128). Concerning data frame 104, the length of transfer 60 is 1396-bytes (i.e., the sum of two 508-byte data portions 130, 132, one 252-byte data portion 140, and one 128-byte data portion 142).

The initial source address 62 may indicate the memory address (within source memory device 48) to which the first byte of a data frame is written. As discussed above, the initial source address 62 for data frame 100 may be $0000_h$. For data frame 102, the initial source address 62 may be $0580_h$, and the initial source address 62 may be $0B00_h$ for data frame 104.

The initial destination address 54 may indicate the memory address (within destination memory device 50) to which the first byte of a data frame may be written, after being processed to removed embedded markers. For this example, assume that the initial destination address for stripped frame 100' is $1000_h$. As stripped frame 100' (i.e., data frame 100 after markers 110, 112 have been stripped) is only 1400-bytes long (as opposed to 1408-bytes), the initial destination address for stripped frame 102' is $1578_h$ (assuming that the first byte of stripped frame 102' is placed directly after the last byte of stripped frame 100'). Further, since stripped frame 102' is only 1396-bytes long (as opposed to 1408-bytes), the initial destination address for stripped frame 104' is $1AEC_h$ (again, assuming that the first byte of stripped frame 104' is placed directly after the last byte of stripped frame 102').

The marker offset 56 may be the number of bytes between the beginning of a frame and the first marker. For example, for frame 100, marker offset 56 is 508-bytes. The marker offset 56 is 124-bytes for frame 102, and the marker offset is 252-bytes for frame 104.

The marker size 58 may be the length of the marker in bytes. As, in this example, the data frames are encoded using the iWARP protocol, the marker size is 4-bytes. However, this is for illustrative purposes only, as other encoding schemes may be used, resulting in different marker sizes. An implementation may use a fixed marker length specific to a particular protocol. Such a specialized implementation may benefit from reduced implementation complexity.

The marker stride 60 may be the spacing between the markers (i.e., the data length). As, in this example, the data frames are encoded using the iWARP protocol, the marker stride is 508-bytes. However, this is for illustrative purposes only, as other encoding schemes may be used, resulting in different marker strides.

An implementation may use a fixed marker stride specific to a particular protocol. Such a specialized implementation may benefit from reduced implementation complexity.

Figure 4:
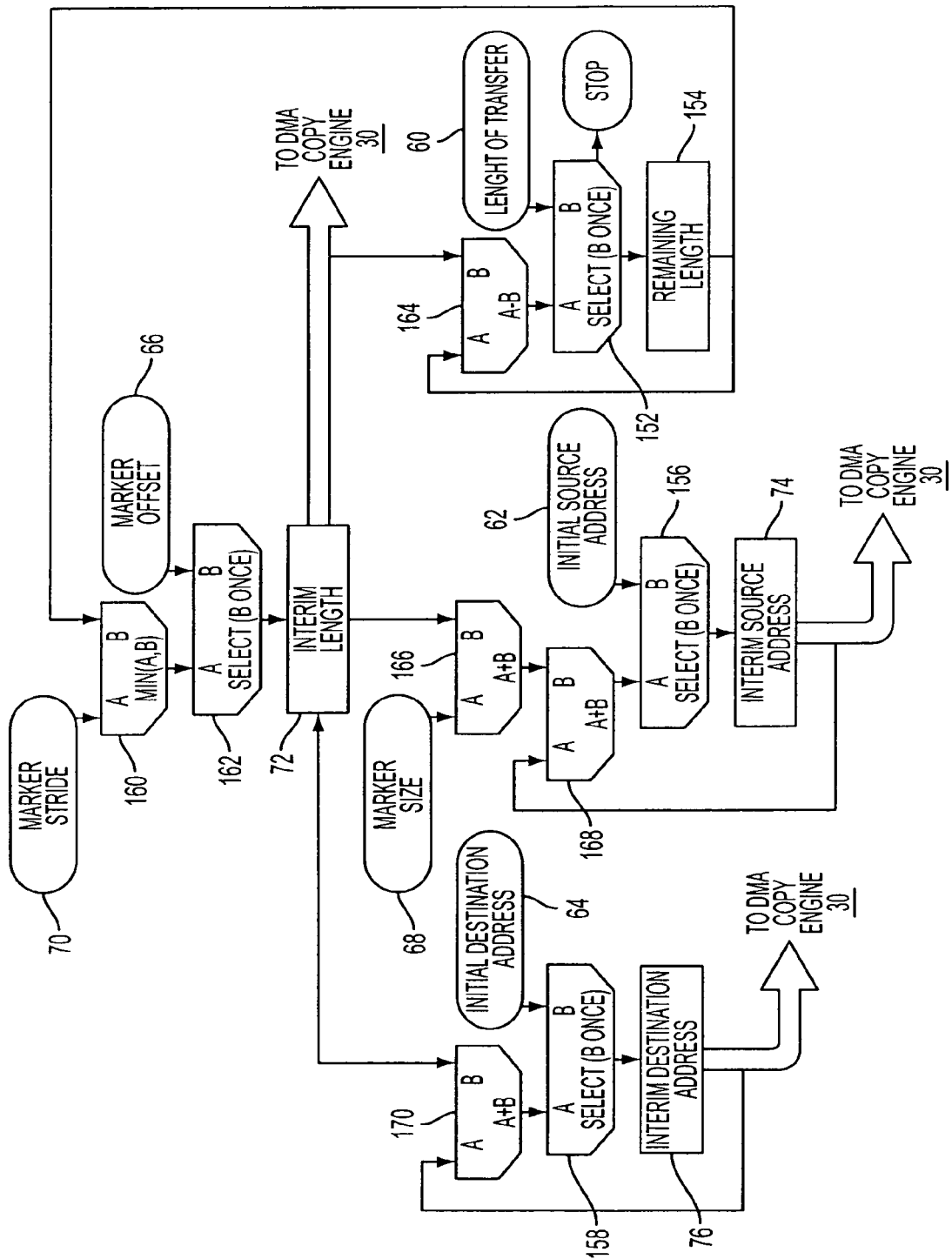
FIG. 4 is a flow chart of the marker stripping systems of FIG. 1a and FIG. 1b.

Referring also to FIG. 4, there is shown a flowchart that details the operation of marker stripping system 38/38'. As discussed above, the protocol layer may provide marker stripping system 10 with:length of transfer 60; initial source address 62; initial destination address 64; marker offset 66; marker size 68; and marker stride 70. Accordingly, when data frame 100 is received, marker stripping system may be provided with the following information:

| Variable: | Value: |
|---|---|
| Length of Transfer (60) | 1400-bytes |
| Initial Source Address (62) | $0000_h$ |
| Initial Destination Address (64) | $1000_h$ |
| Marker Offset (66) | 508-bytes |
| Marker Size (68) | 4-bytes |
| Marker Stride (70) | 508-bytes |

Selection block 152 may select "Input B" once, thus setting remaining length 154 to the length of transfer 60 (i.e., 1400-bytes).

Similar to selection block 152, selection block 156 may select "Input B" once, thus setting interim source address 74 equal to initial source address 62 (i.e., $0000_h$), which is the address at which the first byte of 508-byte data portion 106 may be read from in source memory device 48. Further, selection block 158 may select "Input B" once, thus setting interim destination address 76 equal to initial destination address 64 (i.e., $1000_h$), which is the address at which the first byte of 508-byte data portion 106' may be written to in destination memory device 50.

Comparison block 160 may then compare marker stride 70 (i.e., 508-bytes) to remaining length 154 (i.e., 1400-bytes) and may select the lesser of the two. Accordingly, comparison block 160 may select "Input A" and provides a 508-byte value to selection block 162. Similar to selection block 152, selection block 162 may select "Input B" (i.e., marker offset 66) once, thus setting the interim length 72 equal to the marker offset 66 (i.e., 508-bytes).

Accordingly, the following information may be provided to DMA copy engine 38:

| Variable: | Value: |
|---|---|
| Interim Length (72) | 508-bytes |
| Interim Source Address (74) | $0000_h$ |
| Interim Destination Address (76) | $1000_h$ |

DMA copy engine 38 may then read 508-bytes of data (i.e., data portion 106) from source memory device 48 beginning at address 0000h and may write that 508-bytes of data (i.e., data portion 106') to destination memory device 50 beginning at address $1000_h$.

Subtraction block 164 may then subtract interim length 72 (i.e., 508-bytes) from remaining length 154 (i.e., 1400-bytes) to generate a value of 892-bytes that may be provided to "Input A" of selection block 152. Selection block 152 may now select "Input A" (as "Input B" may be selected only once). Accordingly, remaining length 154 may now be set to 892-bytes.

Interim length 72 (i.e., 508-bytes) may also be provided to "Input B" of addition block 166, which sums interim length 72 with marker size 68 (i.e., 4-bytes) to generate a value of 512-bytes, which may be provided to "Input B" of addition block 168. Addition block 168 may increment the previous interim source address 74 (i.e., $0000_h$) by 512-bytes, resulting in a new address of $0200_h$. This new value may pass through selection block 156, and the new interim source address may be set to $0200_h$, which is the address at which the first byte of 508-byte data portion 108 may be read from in source memory device 48.

Interim length 72 (i.e., 508-bytes) may also be provided to "Input B" of addition block 170, which may increment the previous interim destination address 76 (i.e., $1000_h$) by interim length 72 (i.e., 508-bytes), resulting in a new interim destination address of $11FC_h$. This new value may pass through selection block 158, and the new interim destination address may be set to $11FC_h$, which is the address at which the first byte of 508-byte data portion 108' may be written to in destination memory device 50.

Comparison block 160 may then compare marker stride 70 (i.e., 508-bytes) to remaining length 154 (i.e., 892-bytes) and may select the lesser of the two. Accordingly, comparison block 160 may select "Input A" and may provide a 508-byte value to "Input A" of selection block 162. Selection block 162 may select "Input A", thus setting the interim length 72 to 508-bytes.

Accordingly, the following information may be provided to DMA copy engine 38:

| Variable: | Value: |
|---|---|
| Interim Length (72) | 508-bytes |
| Interim Source Address (74) | $0200_h$ |
| Interim Destination Address (76) | $11FC_h$ |

DMA copy engine 38 may then read 508-bytes of data (i.e., data portion 108) from source memory device 48 beginning at address $0200_h$, and may write that 508-bytes of data (i.e., data portion 108') to destination memory device 50 beginning at address $11FC_h$.

Accordingly, by reading 508-bytes of data (i.e., "X" bytes) and incrementing the interim source address 74 by the sum of the interim length 72 and the marker size 68 (i.e., "Y" bytes), the embedded markers are not read. For example, the first read operation (described above) specified an interim source address 74 of $0000_h$. Beginning at this address, 508-bytes of data (i.e., data portion 106) are read (i.e., "X" bytes of data are read). However, when the interim source address is incremented (by addition block 168), the interim source address is incremented by "Y" bytes, that is 512-bytes (i.e., to the beginning of data portion 108), thus skipping over marker 110. Accordingly, when the second read operation is performed, 508-bytes of data (i.e., data portion 108) may be read, beginning at interim source address $0200_h$.

Provided that "Y" bytes is greater than "X" bytes, the amount that the interim source address is incremented is greater than the amount of data read. Therefore, the markers (e.g., marker 110) will be skipped, such that the size of the marker skipped is defined by "Y" bytes minus "X" bytes.

Continuing with the above-stated example, subtraction block 164 may subtract interim length 72 (i.e., 508-bytes) from remaining length 154 (i.e., 892-bytes) to generate a value of 384-bytes that may be provided to "Input A" of selection block 152. Selection block 152 may now select "Input A" (as "Input B" may be selected only once). Accordingly, remaining length 154 may now be set to 384-bytes.

Interim length 72 (i.e., 508-bytes) may also be provided to "Input B" of addition block 166, which may sum interim length 72 with marker size 68 (i.e., 4-bytes) to generate a value of 512-bytes, which may be provided to "Input B" of addition block 168. Addition block 168 may increment the previous interim source address 74 (i.e., $0200_h$) by 512-bytes, resulting in a new address of $0400_h$. This new value may pass through selection block 160, and the new interim source address may be set to $0400_h$, which is the address at which the first byte of 384-byte data portion 114 may be read from in source memory device 48.

Interim length 72 (i.e., 508-bytes) may also be provided to "Input B" of addition block 170, which may increment the previous interim destination address 76 (i.e., $11FC_h$) by interim length 72 (i.e., 508-bytes), resulting in a new interim destination address of $13F8_h$. This new value may pass through selection block 162, and the new interim destination address may be set to $13F8_h$, which is the address at which the first byte of 384-byte data portion 114' may be written to in destination memory device 50

Comparison block 160 may then compare marker stride 70 (i.e., 508-bytes) to remaining length 154 (i.e., 384-bytes) and may select the lesser of the two. Accordingly, comparison block 160 may select "Input B" and may provide a 384-byte value to "Input A" of selection block 162. Selection block 162 may select "Input A", thus setting interim length 72 to 384-bytes.

Accordingly, the following information may be provided to DMA copy engine 38:

| Variable: | Value: |
|---|---|
| Interim Length (72) | 384-bytes |
| Interim Source Address (74) | $0400_h$ |
| Interim Destination Address (76) | $13F8_h$ |

DMA copy engine 38 may then read 384-bytes of data (i.e., data portion 114) from source memory device 48 beginning at address $0400_h$, and may write that 384-bytes of data (i.e., data portion 114') to destination memory device 50 beginning at address $13F8_h$.

Again, by reading 508-bytes of data (i.e., "X" bytes) and incrementing the interim source address 74 by the sum of the interim length 72 and the marker size 68 (i.e., "Y" bytes), the embedded markers are not read. For example, the second read operation (described above) specified an interim source address 74 of $0200_h$. Beginning at this address, 508-bytes of data (i.e., data portion 108) are read (i.e., "X" bytes of data are read). However, when the interim source address is incremented (by addition block 168), the interim source address is incremented by "Y" bytes, that is 512-bytes (i.e., to the beginning of data portion 114), thus skipping over marker 112. Accordingly, when the third read operation is performed, 384-bytes of data (i.e., data portion 114) are read, beginning at interim source address $0400_h$.

Again, provided that "Y" bytes is greater than "X" bytes, the amount that the interim source address is incremented is greater than the amount of data read. Therefore, the markers (e.g., marker 112) will be skipped, such that the size of the marker skipped is defined by "Y" bytes minus "X" bytes.

Continuing with the above-stated example, subtraction block 164 may subtract interim length 72 (i.e., 384-bytes) from remaining length 154 (i.e., 384-bytes) to generate a value of 0-bytes that may be provided to "Input A" of selection block 152. As the remaining length is 0-bytes, selection block 152 may terminate the process, as the processing of data frame 100 is complete.

As discussed above, a total of three data frames (i.e., data frames 100, 102, 104) will be transferred. The processing of the remaining data frames (i.e., data frames 102, 104) may be accomplished in the same manner as that of data frame 100.

Accordingly, when data frame 102 is received, marker stripping system 38/38' may be provided with the following information:

| Variable: | Value: |
|---|---|
| Length of Transfer (60) | 1396-bytes |
| Initial Source Address (62) | $0580_h$ |
| Initial Destination Address (64) | $1578_h$ |
| Marker Offset (66) | 124-bytes |
| Marker Size (68) | 4-bytes |
| Marker Stride (70) | 508-bytes |

Further, when data frame 104 is received, marker stripping system 38/38' may be provided with the following information:

| Variable: | Value: |
|---|---|
| Length of Transfer (60) | 1396-bytes |
| Initial Source Address (62) | 0B00$_h$ |
| Initial Destination Address (64) | 1AEC$_h$ |
| Marker Offset (66) | 252-bytes |
| Marker Size (68) | 4-bytes |
| Marker Stride (70) | 508-bytes |

While the system is described above as being utilized with the iWARP protocol, other configuration are possible, as the above-described system may be used with any protocol that includes markers (e.g., the iSCSI protocol).

A number of implementations have been described. Nevertheless, it will be understood that various modifications may be made. Accordingly, other implementations are within the scope of the following claims.

What is claimed is:

1. A method comprising:
   defining an initial source address within a source memory device;
   defining a length of transfer for a data segment to be processed, wherein the source memory device contains the data segment and a first X-byte data portion is included within the data segment;
   performing an initial data read operation to retrieve said first X-byte data portion from the source memory device, wherein the initial data read operation begins at the initial source address;
   decrementing the length of transfer by X bytes in response to retrieving the first X-byte data portion, thus defining a remaining length;
   comparing the remaining length to a marker stride to define an interim length, wherein the interim length defines X; and
   incrementing the initial source address by Y bytes to define a secondary source address within the source memory device;
   wherein Y is greater than X.

2. The method of claim 1 further comprising:
   performing a secondary data read operation to retrieve a second X-byte data portion from the source memory device, wherein the secondary data read operation begins at the secondary source address.

3. The method of claim 2 further comprising:
   defining an initial destination address within a destination memory device;
   performing an initial data write operation to write the first X-byte data portion to the destination memory device, wherein the initial data write operation begins at the initial destination address; and
   incrementing the initial destination address by X bytes to define a secondary destination address within the destination memory device.

4. The method of claim 3 further comprising:
   performing a secondary data write operation to write the second X-byte data portion to the destination memory device, wherein the secondary data write operation begins at the secondary destination address.

5. The method of claim 1 wherein the data segment is a data frame.

6. The method of claim 1,
   wherein said data segment is transfeffed from a first memory source to a second memory source using remote direct memory access (RDMA) over transmission control protocol/internet protocol (TCP/IP).

7. The method of claim 1 further comprising:
   receiving said data segment at said source memory device, wherein said source memory device comprises at least one data buffer and wherein said data segment comprises at least one embedded marker;
   stripping said at least one embedded marker from said data segment; and
   writing said stripped data segment to an initial destination address within a destination memory device.

8. An apparatus comprising an integrated circuit, wherein the integrated circuit is capable of:
   defining an initial source address within a source memory device;
   defining a length of transfer for a data segment to be processed, wherein the source memory device contains the data segment and a first X-byte data portion is included within the data segment;
   performing an initial data read operation to retrieve said first X-byte data portion from the source memory device, wherein the initial data read operation begins at the initial source address;
   decrementing the length of transfer by X bytes in response to retrieving the first X-byte data portion, thus defining a remaining length;
   comparing the remaining length to a marker stride to define an interim length, wherein the interim length defines X; and
   incrementing the initial source address by Y bytes to define a secondary source address within the source memory device;
   wherein Y is greater than X.

9. The apparatus of claim 8 wherein the integrated circuit is further capable of:
   performing a secondary data read operation to retrieve a second X-byte data portion from the source memory device, wherein the secondary data read operation begins at the secondary source address.

10. The apparatus of claim 9 wherein the integrated circuit is further capable of:
    defining an initial destination address within a destination memory device;
    performing an initial data write operation to write the first X-byte data portion to the destination memory device, wherein the initial data write operation begins at the initial destination address; and
    incrementing the initial destination address by X bytes to define a secondary destination address within the destination memory device.

11. The apparatus of claim 10 wherein the integrated circuit is further capable of:
    performing a secondary data write operation to write the second X-byte data portion to the destination memory device, wherein the secondary data write operation begins at the secondary destination address.

12. The apparatus of claim 8 wherein the data segment is a data frame.

13. The apparatus of claim 8 wherein the integrated circuit is further capable of:
    receiving said data segment at said source memory device, wherein said source memory device comprises at least one data buffer and wherein said data segment comprises at least one embedded marker;
    stripping said at least one embedded marker from said data segment; and writing said stripped data segment to an initial destination address within a destination memory device.

14. A computer program product residing on a computer readable medium having a plurality of instructions stored thereon which, when executed by the processor, cause that processor to:

define an initial source address within a source memory device;

define a length of transfer for a data segment to be processed, wherein the source memory device contains the data segment and a first X-byte data portion is included within the data segment;

perform an initial data read operation to retrieve said first X-byte data portion from the source memory device, wherein the initial data read operation begins at the initial source address;

decrement the length of transfer by X bytes in response to retrieving the first X-byte data portion, thus defining a remaining length;

compare the remaining length to a marker stride to define an interim length, wherein the interim length defines X; and increment the initial source address by Y bytes to define a secondary source address within the source memory device;

wherein Y is greater than X.

15. The computer program product of claim 14 further comprising instructions for:

performing a secondary data read operation to retrieve a second X-byte data portion from the source memory device, wherein the secondary data read operation begins at the secondary source address.

16. The computer program product of claim 15 further comprising instructions for:

defining an initial destination address within a destination memory device;

performing an initial data write operation to write the first X-byte data portion to the destination memory device, wherein the initial data write operation begins at the initial destination address; and incrementing the initial destination address by X bytes to define a secondary destination address within the destination memory device.

17. The computer program product of claim 16 further comprising instructions for:

performing a secondary data write operation to write the second X-byte data portion to the destination memory device, wherein the secondary data write operation begins at the secondary destination address.

18. The computer program product of claim 14 wherein the data segment is a data frame.

19. The computer program product of claim 14 further comprising instructions for:

receiving said data segment at said source memory device, wherein said source memory device comprises at least one data buffer and wherein said data segment comprises at least one embedded marker;

stripping said at least one embedded marker from said data segment; and writing said stripped data segment to an initial destination address within a destination memory device.

20. An expansion card comprising an integrated circuit capable of communicating in accordance with a plurality of different communication protocols, the expansion card being capable of being coupled to a bus, and the integrated circuit further being capable of:

defining an initial source address within a source memory device;

defining a length of transfer for a data segment to be processed, wherein the source memory device contains the data segment and a first X-byte data portion is included within the data segment;

performing an initial data read operation to retrieve said first X-byte data portion from the source memory device, wherein the initial data read operation begins at the initial source address;

decrementing the length of transfer by X bytes in response to retrieving the first X-byte data portion, thus defining a remaining length;

comparing the remaining length to a marker stride to define an interim length, wherein the interim length defines X; and incrementing the initial source address by Y bytes to define a secondary source address within the source memory device;

wherein Y is greater than X.

21. The expansion card of claim 20 wherein the integrated circuit is further capable of:

performing a secondary data read operation to retrieve a second X-byte data portion from the source memory device, wherein the secondary data read operation begins at the secondary source address.

22. The expansion card of claim 21 wherein the integrated circuit is further capable of:

defining an initial destination address within a destination memory device;

performing an initial data write operation to write the first X-byte data portion to the destination memory device, wherein the initial data write operation begins at the initial destination address; and incrementing the initial destination address by X bytes to define a secondary destination address within the destination memory device.

23. The expansion card of claim 22, wherein the integrated circuit is further capable of:

performing a secondary data write operation to write the second X-byte data portion to the destination memory device, wherein the secondary data write operation begins at the secondary destination address.

24. The expansion card of claim 20, wherein the integrated circuit is further capable of:

receiving said data segment at said source memory device, wherein said source memory device comprises at least one data buffer and wherein said data segment comprises at least one embedded marker;

stripping said at least one embedded marker from said data segment; and writing said stripped data segment to an initial destination address within a destination memory device.

* * * * *